United States Patent
Parizek et al.

(10) Patent No.: US 12,511,776 B2
(45) Date of Patent: Dec. 30, 2025

(54) VESSEL SAND MONITORING USING INFRARED IMAGES

(71) Applicant: Chevron U.S.A. Inc., San Ramon, CA (US)

(72) Inventors: Jason Robert Parizek, Midland, TX (US); Andrei Sergiu Popa, Humble, TX (US); Soong Hay Tam, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 406 days.

(21) Appl. No.: 18/331,021

(22) Filed: Jun. 7, 2023

(65) Prior Publication Data

US 2024/0020869 A1   Jan. 18, 2024

Related U.S. Application Data

(60) Provisional application No. 63/368,215, filed on Jul. 12, 2022.

(51) Int. Cl.
*G06T 7/70* (2017.01)
*G06V 10/26* (2022.01)
*G06V 10/56* (2022.01)

(52) U.S. Cl.
CPC ............ *G06T 7/70* (2017.01); *G06V 10/26* (2022.01); *G06V 10/56* (2022.01); *G06T 2207/10048* (2013.01)

(58) Field of Classification Search
CPC . G06T 7/70; G06T 2207/10048; G06V 10/56; G06V 20/52; G06V 10/26
See application file for complete search history.

(56) References Cited

U.S. PATENT DOCUMENTS

| | | | |
|---|---|---|---|
| 2006/0130879 A1* | 6/2006 | Desormeaux | B08B 9/0933 134/10 |
| 2012/0287749 A1* | 11/2012 | Kutlik | G01F 23/2962 73/290 V |
| 2019/0033898 A1* | 1/2019 | Shah | G01N 29/4427 |
| 2021/0077923 A1* | 3/2021 | Carlson | B01D 21/2483 |
| 2022/0154568 A1* | 5/2022 | Fink | F25J 1/0221 |

* cited by examiner

*Primary Examiner* — Syed Haider
(74) *Attorney, Agent, or Firm* — Esplin & Associates, PC

(57) ABSTRACT

Infrared images of a vessel may be obtained and analyzed to determine the amount of sand in the vessel. Portions of the infrared images with low pixel values may be filtered out as depicting background (e.g., sky, ground). Portions of the infrared images with high pixel values may be filtered out as depicting portions of the vessel without sand. The number of pixels depicting the vessel and the number of pixel depicting portions of the vessel with sand may be used to monitor the amount of sand in the vessel and facilitate maintenance operations for the vessel.

16 Claims, 7 Drawing Sheets

VESSEL SAND MONITORING USING INFRARED IMAGES

CROSS-REFERENCE TO RELATED APPLICATIONS

The present application claims the benefit of U.S. Provisional Application No. 63/368,215, entitled "INTELLIGENT APPLICATION OF COMPUTER VISION AND DATA ANALYTICS TO OPTIMIZE THE SEPARATORS CLEANING FOR UNCONVENTIONAL RESERVOIRS," which was filed on: Jul. 12, 2022, the entirety of which is hereby incorporated herein by reference.

FIELD

The present disclosure relates generally to the field of vessel sand monitoring using infrared images and advanced analytics systems.

BACKGROUND

Operations at a hydrocarbon facility may result in sand entering vessels in the facility. Accumulation of sand in the vessels may hinder or prevent operations at the hydrocarbon facility. Manually checking the vessels for sand may be labor intensive, increase risks to personnel, and require shut down of one or more operations at the hydrocarbon facility, which may negatively impact revenue (e.g., loss/deferral of revenue).

SUMMARY

This disclosure relates to vessel sand monitoring. Infrared image information and/or other information may be obtained. The infrared image information may define an infrared image of a scene including a vessel. A first extent of the infrared image depicting the vessel may be determined. A second extent of the infrared image depicting presence of sand in the vessel may be determined. A sand infill value for the vessel may be determined based on the first extent of the infrared image depicting the vessel, the second extent of the infrared image depicting the presence of sand in the vessel, and/or other information. Sand monitoring for the vessel may be facilitated based on the sand infill value for the vessel and/or other information.

A system for vessel sand monitoring may include one or more electronic storage, one or more processors and/or other components. The electronic storage may store infrared image information, information relating to infrared images of a scene, information relating to the scene, information relating to a vessel, information relating to the presence of sand in the vessel, information relating to a sand infill value, information relating to sand monitoring, and/or other information.

The processor(s) may be configured by machine-readable instructions. Executing the machine-readable instructions may cause the processor(s) to facilitate vessel sand monitoring. The machine-readable instructions may include one or more computer program components. The computer program components may include one or more of an infrared image component, a vessel component, a sand component, a sand infill component, a sand monitoring component, and/or other computer program components.

The infrared image component may be configured to obtain infrared image information and/or other information. The infrared image information may define an infrared image of a scene including a vessel. In some implementations, multiple infrared images of the scene including the vessel may be obtained. Individual ones of the multiple infrared images may be captured at different capture times.

The vessel component may be configured to determine a first extent of the infrared image depicting the vessel. In some implementations, determination of the first extent of the infrared image depicting the vessel may include filtering out depictions of sky and ground from the infrared image. The depictions of sky and ground may be filtered out from the infrared image based on pixel values of the infrared image satisfying a low temperature threshold and/or other information.

In some implementations, the pixel values of the infrared image may be determined based on pixels values of a single channel of the infrared image. The single channel of the infrared image may be a blue channel or a green channel of the infrared image.

In some implementations, the pixel values of the infrared image may be determined based on pixels values of multiple channels of the infrared image.

The sand component may be configured to determine a second extent of the infrared image depicting presence of sand in the vessel. In some implementations, determination of the second extent of the infrared image depicting the presence of sand in the vessel may include filtering out a portion of the first extent of the infrared image. The portion of the first extent of the infrared image may be filtered out based on pixel values of the infrared image satisfying a high temperature threshold and/or other information.

The sand infill component may be configured to determine a sand infill value for the vessel. The sand infill value for the vessel may be determined based on the first extent of the infrared image depicting the vessel, the second extent of the infrared image depicting the presence of sand in the vessel, and/or other information.

In some implementations, the sand infill value for individual ones of multiple infrared images captured at different capture times may be determined.

The sand monitoring component may be configured to facilitate sand monitoring for the vessel. The sand monitoring for the vessel may be performed based on the sand infill value for the vessel and/or other information.

In some implementations, a trend of sand infill values for the vessel may be determined based on the sand infill value for individual ones of multiple infrared images captured at different capture times, the capture times of the multiple infrared images, and/or other information. A future sand infill value for the vessel may be determined based on the trend of sand infill values for the vessel and/or other information.

In some implementations, facilitation of the sanding monitoring for the vessel based on the sand infill value for the vessel may include recommendation or automation of one or more maintenance operations for the vessel based on the sand infill value and/or other information. In some implementations, the sand infill value for the vessel may be modified based on inspection of sand in the vessel and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to vessel sand monitoring. Infrared images of a vessel may be obtained and analyzed to determine the amount of sand in the vessel. Portions of the infrared images with low pixel values may be filtered out as depicting background (e.g., sky, ground). Portions of the infrared images with high pixel values may be filtered out as depicting portions of the vessel without sand. The number of pixels depicting the vessel and the number of pixel depicting portions of the vessel with sand may be used to monitor the amount of sand in the vessel and facilitate maintenance operations for the vessel.

Figure 1:
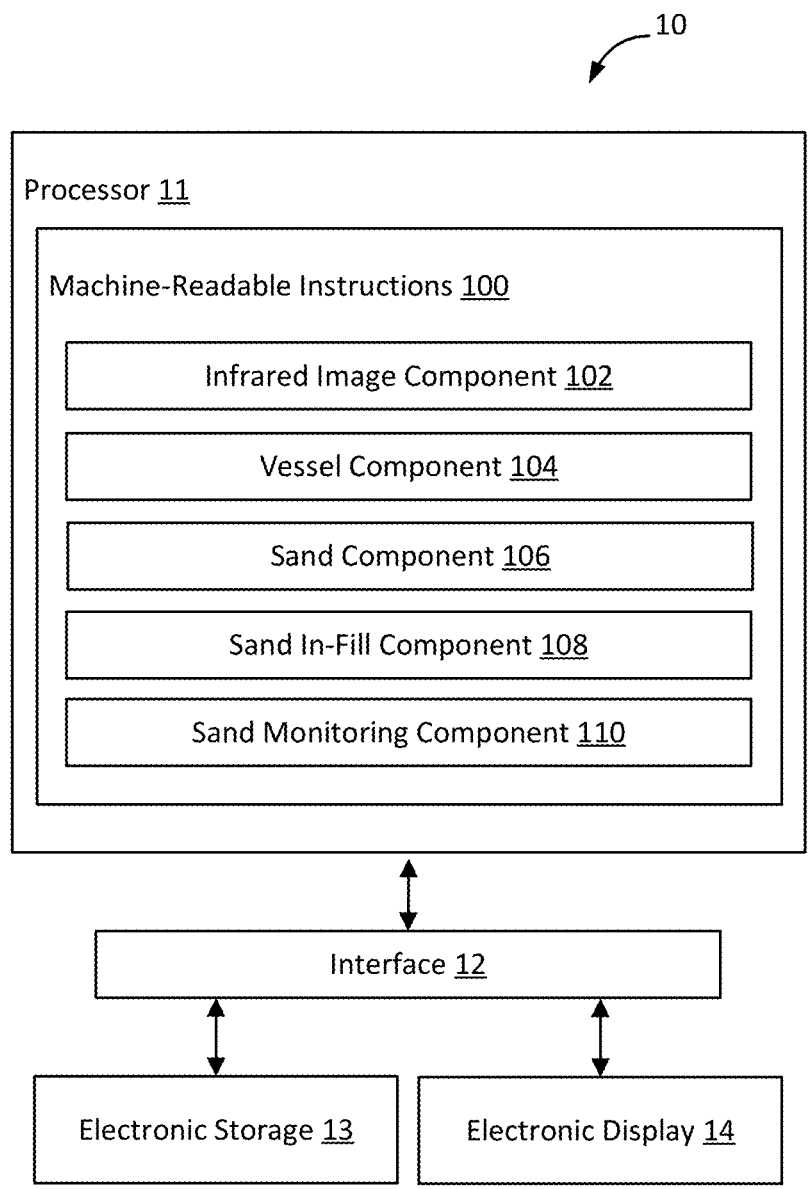
FIG. 1 illustrates an example system for vessel sand monitoring.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, an electronic display 14, and/or other components. Infrared image information and/or other information may be obtained by the processor 11. The infrared image information may define an infrared image of a scene including a vessel. A first extent of the infrared image depicting the vessel may be determined by the processor 11. A second extent of the infrared image depicting the presence of sand in the vessel may be determined by the processor 11. A sand infill value for the vessel may be determined by the processor 11 based on the first extent of the infrared image depicting the vessel, the second extent of the infrared image depicting the presence of sand in the vessel, and/or other information. Sand monitoring for the vessel may be facilitated by the processor 11 based on the sand infill value for the vessel and/or other information.

The electronic storage 13 may include one or more electronic storage media that electronically stores information. The electronic storage 13 may store software algorithms, information determined by the processor 11, information received remotely, and/or other information that enables the system 10 to function properly. For example, the electronic storage 13 may store infrared image information, information relating to infrared images of a scene, information relating to the scene, information relating to a vessel, information relating to the presence of sand in the vessel, information relating to a sand infill value, information relating to sand monitoring, and/or other information.

The electronic display 14 may refer to an electronic device that provides visual presentation of information. The electronic display 14 may include a color electronic display and/or a non-color electronic display. The electronic display 14 may be configured to visually present information. The electronic display 14 may present information using/within one or more graphical user interfaces. For example, the electronic display 14 may present infrared image information, information relating to infrared images of a scene, information relating to the scene, information relating to a vessel, information relating to the presence of sand in the vessel, information relating to a sand infill value, information relating to sand monitoring, and/or other information.

A well may refer to a hole that is drilled in the ground. A well may be drilled in the ground for exploration and/or recovery of resources in the ground, such as water or hydrocarbons. Operation of a well may result in sand entering the well, which may be carried to the surface during flowback and production. Accumulation of sand during production (e.g., production of oil and/or gas) may reduce the efficiency of production and/or damage the equipment.

For example, the reliability of the production operations may depend not only on the well performance but also on the effectiveness of the surface facilities to transport and separate the produced fluids. In the case of unconventional reservoirs, the completion treatments placed to stimulate the long horizontal wells may require large volumes of proppant and water. During flowback and even later in the life of the well, fractions of the proppant may make its way to the surface and into the separators. A separator may include a pressure vessel for separating well fluid products from the well into gaseous and liquid components. Large accumulations of sand may reduce the ability of the separators to perform as designed, impacting production and requiring complete shut-down for cleaning to restore their original capability.

Production separator reliability is a critical part of any production operations. Separators enable segregation of produced fluids into individual streams (oil, water, gas) and prepare for distribution into their respective distribution networks. Quality standards for oil and gas sales, and water management operations require effective separation. In unconventional wells, in addition to oil, water, and gas traditionally produced during operations, a small fraction of the sand utilized for proppant during the initial completion may be entrained in the produced fluid during early production periods.

The sand production curve of a typical well may be analogous to declines of the other production streams. Produced sand concentrations may start at high rates and decline to low concentrations relative to initial rates in the days to weeks after a well is brought on production. Following that initial period of steep decline, relatively low concentrations of sand may continue to flow back for months to a year following the initial production period.

To prevent sand from inundating permanent facilities during flowback, temporary sand separation equipment may be installed inline between the well and production facilities, at an incremental cost. This equipment prevents sand from flowing through permanent piping where it could lead to erosion or accumulate in permanent facilities not designed to handle large concentrations of sand common in early production periods. Sand separation equipment may be used inline until there is no sand in the produced fluid stream.

However, it is cost prohibitive to continue to retain sand separation equipment on the well.

A manual time-based maintenance program may be implemented to periodically take vessels offline and perform inspections and cleanouts. However, a time-based maintenance programs is rarely optimized. If the inspection is too frequent, maintenance costs and downtime may accumulate. If the inspection is too sparse, sand may block ports, wash out valves, or lead to water carryover due to diminished effective vessel volume.

The present disclosure provides an intelligent tool to quantify and monitor sand inside vessels. Infrared images of vessels may be analyzed to determine the amounts of sand inside the vessels. Computer vision and data analytics may be utilized to increase the efficiency (e.g., optimize) of vessel maintenance. For example, the present disclosure may be used to optimize separator cleaning for unconventional reservoirs. For instance, the present disclosure may provide an intelligent end-to-end workflow integrating computer vision and data analytics to automatically interpret infrared images and identify when a production separator needs condition-based maintenance. Contrasted to the manual method, where vessels are taken offline, visually inspected, and cleaned out on time-based maintenance schedules, the present disclosure provides an accurate visualization of the sand level in vessels using computer vision.

While the present disclosure is described with respect to separators for unconventional reservoirs, this is merely as an example and is not meant to be limiting. Application of the present disclosure to other equipment/places is contemplated. While the present disclosure is described with respect to sand, this is merely as an example and is not meant to be limiting. Application of the present disclosure to other proppant/materials inside the vessel is contemplated.

The present disclosure enables monitoring of sand inside vessels that is safer, less invasive, and less costly than manual inspections of vessels. The present disclosure may enable automated analysis of sand inside vessels to facilitate maintenance operations (e.g., increase efficiency of maintenance operations, optimize maintenance operations). The amount and/or speed with which the vessels are filled with sand may be forecasted and used to schedule maintenance operations.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate vessel sand monitoring. The machine-readable instructions 100 may include one or more computer program components. The machine-readable instructions 100 may include one or more of an infrared image component 102, a vessel component 104, a sand component 106, a sand infill component 108, a sand monitoring component 110, and/or other computer program components.

The infrared image component 102 may be configured to obtain infrared image information and/or other information. Obtaining infrared image information may include one or more of accessing, acquiring, analyzing, determining, examining, generating, identifying, loading, locating, measuring, opening, receiving, retrieving, reviewing, selecting, storing, and/or otherwise obtaining the infrared image information.

The infrared image component 102 may obtain infrared image information from one or more locations. For example, the infrared image component 102 may obtain infrared image information from a storage location, such as the electronic storage 13, electronic storage of a device accessible via a network, and/or other locations. The infrared image component 102 may obtain current infrared image from one or more hardware components (e.g., a computing device, an infrared camera) and/or one or more software components (e.g., software running on a computing device). In some implementations, the infrared image information may be obtained from one or more users. For example, a user may interact with a computing device to identify or input infrared image information (e.g., upload infrared images).

The infrared image information may define one or more infrared images of a scene including a vessel. The infrared image information may define an infrared image by describing, characterizing, and/or otherwise defining the infrared image. The infrared image information may define an infrared image by including information that defines one or more content, qualities, attributes, features, and/or other aspects of the infrared image. For example, the infrared image information may define an infrared image by including information that makes up the content of the infrared image and/or information that is used to determine the content of the infrared image. For instance, the infrared image information may include information that makes up and/or is used to determine the arrangement of pixels, characteristics of pixels, values of pixels, and/or other aspects of pixels that define infrared image. Other types of infrared image information are contemplated.

The infrared image information may define one or more infrared images of a scene captured by an infrared camera. Infrared images may refer to images that depict the amount of infrared energy emitted, transmitted, and/or reflected by a thing. Pixel values of infrared images may correspond to temperature of the thing. An infrared camera may refer to an image capture device that captures infrared images. An infrared camera may capture infrared images using one or more infrared imaging techniques (e.g., thermal imaging, optical gas imaging, short-wave infrared imaging, mid-wave infrared imaging, long-wave infrared imaging, spectral imaging, wavelength-modulation spectroscopy imaging, LiDAR imaging).

A scene may refer to a place and/or a location in which an infrared camera is located while capturing infrared images. A scene may include one or more portions of a place and/or a location at which the infrared camera is directed/pointed during capture of infrared images. A scene may include one or more portions of a place and/or a location that are within the field of view of the infrared camera during capture of infrared images.

A scene may include one or more vessels. A vessel may refer to a hollow body/container. A vessel may be designed to hold, convey, and/or process liquids, vapors, gases, and/or other materials. A vessel (pressure vessel) may be designed to hold, convey, and/or process liquids, vapors, gases, and/or other materials at high pressure (e.g., above 15 psi).

Figure 3:
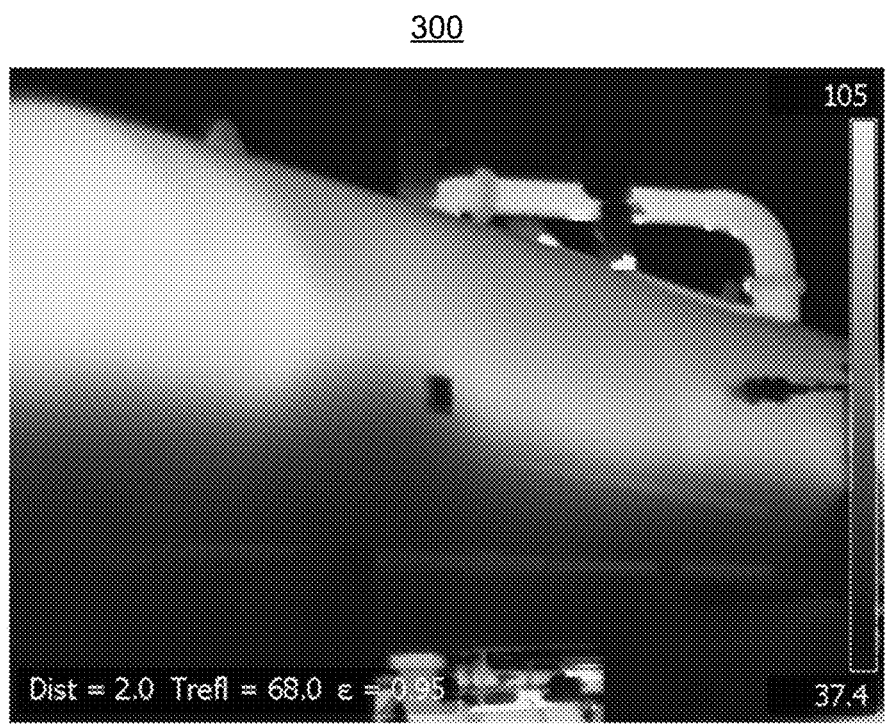
FIG. 3 illustrates an example infrared image of a scene.

FIG. 3 illustrates an example infrared image 300 of a scene. The image 300 may include depiction of a vessel, along with the sky above the vessel and the ground below the vessel. In the infrared image 300, lighter colors (e.g., yellow) may represent high temperatures while darker colors (e.g., purple) may represent cooler temperatures.

Infrared images that depict vessels may be used to detect and monitor sand inside the vessel by taking advantage of the insulative effect that a bed of sand at the base of a vessel provides. For example, a sand free 2-phase or 3-phase separator may provide residence time for the mix of produced fluids to segregate based on density variations into a column of water, oil/condensate, and gas. Despite the residence time, the fluids may be continuously moving though the separator. As heat is exchanged from the fluids into the walls of the vessel and eventually into the air at the vessel wall, warm fluids from the well replenishes that heat. An infrared image of a clean separator may reveal a relatively uniform distribution of heat laterally from inlet to outlet. Vertically, a subtle thermal gradient may exist from warmer liquids at the base of a 3-phase vessel cooling vertically through the water/oil, oil/gas interfaces, largely due to the variable heat capacities of each fluid.

On the other hand, when sand, or other material (proppant), is present in the fluid stream, the higher density of sand relative to the produced fluids may result in accumulation of sand in the bottom of the vessel. Over time, the base of the vessel may be covered with sand, becoming a significantly less permeable area of the vessel. As such, as warm fluids pass through the vessel, minimal fluid exchanges with the liquid in the pore space of the sand bed at the base of the vessel. This area becomes a dead zone and heat loss in regions of the vessel next to the sand bed is not replenished at the same rate as those without sand. Thus, the sand covered area of the vessel may show up as cooler regions in infrared images.

In some implementations, the infrared images may be captured under one or more environmental conditions. For example, to ensure adequate contrast, the infrared images may be captured when the difference between ambient temperature and vessel temperature is more than a threshold amount. Increase in the difference between ambient temperature and vessel temperature may increase contrast in the infrared images. For example, the infrared images may be captured during night when ambient temperature is at its lowest to maximize difference between ambient temperature and vessel temperature. As another example, the infrared images may be captured during a cold season rather than a hot season. Heated production separators and heater treaters may be difficult to accurately image when burners are active, and infrared images may be captured when burners are off. Reflections from nearby hot equipment may saturate infrared images and create hot spots. The color scale of these saturated infrared images may be adjusted to reveal the subdued detail that is compressed within the cold end of the thermal spectrum of the color scale.

In some implementations, a quality control step may be used to remove poor quality infrared images from analysis. For example, the quality of an infrared image may be poor due to thermal saturation from reflections that appear as hot spots within the infrared image. These hots spots may generally take up less than a certain percentage of the infrared image (e.g., less than 10%). The amount (e.g., number, percentage) of pixels in the infrared image that depicts warm colors may be determined. For example, the amount of pixels in the infrared image with pixel values higher than a certain threshold value may be determined. The pixels with pixel values higher than the threshold value may be deemed as depicting clean volume of the vessel—parts of the vessel without sand. If the amount of pixels in the infrared image is less than a threshold amount (e.g., less than 10%), then the quality of the infrared image may be deemed to be poor since it is unlikely that a vessel is 90% full of sand. Such infrared images may be removed from further analysis. The quality control step may be performed using all channels of the infrared image, multiple channels of the infrared image, or a single channel of the infrared image (e.g., blue channel, green channel, or combination of blue and green channels).

In some implementations, the infrared images may be captured using one or more guidelines. A guideline may indicate how an infrared camera should be operated to capture infrared images. For example, guideline(s) may indicate that infrared images should be captured by filling the image frame with the vessel, which reduces noise during capture. For instance, the top of the vessel may be aligned with the top of the infrared image and the base of the vessel may be aligned with the base of the infrared image. The entire length of the vessel may not be required to be within the image frame. Guideline(s) may indicate that infrared image should be captured with a full range of color scale (e.g., include pixels that depict both hot and cold regions). Other guidelines to capture infrared images are contemplated.

In some implementations, one or more steps of the present disclosure may be automated responsive to capture of one or more infrared images. For example, responsive to capture of an infrared image depicting a vessel, extents of the infrared image depicting (1) the vessel and (2) the presence of sand may be determined to calculate a sand infill value for the vessel, which may then be used to perform sand monitoring for the vessel.

In some implementations, multiple infrared images of the scene including the vessel may be obtained. Individual ones of the multiple infrared images may be captured at different capture times. Capture times may refer to moments when the infrared images are captured (e.g., generated, converted, recorded) by an infrared camera. Multiple infrared images captured at different capture times may be obtained to build time series data on the presence of sand inside the vessel.

The vessel component 104 may be configured to determine one or more extents of an infrared image depicting the vessel. Determining an extent of an infrared image depicting the vessel may include ascertaining, approximating, calculating, categorizing, classifying, detecting, establishing, estimating, finding, identifying, obtaining, quantifying, segmenting, and/or otherwise determining the extent of the infrared image depicting the vessel. Determining an extent of an infrared image depicting the vessel may include determining which extents of the infrared image is depicting the vessel. Determining an extent of an infrared image depicting the vessel may include determining which extents of the infrared image is not depicting the vessel and finding the inverse of those extents. Determining an extent of an infrared image depicting the vessel may include determining pixels of the infrared image that depicts the vessel. Determining an extent of an infrared image depicting the vessel may include determining pixels of the infrared image that do not depict the vessel and finding inverse of those pixels.

In some implementations, determination of the extent(s) of the infrared image depicting the vessel may include filtering out depictions of sky and ground from the infrared image. The infrared image may depict the sky above the vessel and the ground below the vessel. The sky above the vessel and the ground below the vessel may be filtered out as depicting the background/not depicting the vessel. Filtering out other depictions is contemplated.

The background (e.g., depictions of sky and ground) may be filtered out from the infrared image based on pixel values of the infrared image satisfying a low temperature threshold and/or other information. A low temperature threshold may refer to a value of temperature that a pixel value must be lower than (or equal to) for the corresponding pixel to be identified as depicting background. A low temperature threshold may refer to the minimum temperature value of a vessel. The pixels values of the infrared image that satisfy the low temperature threshold may be identified as depicting the background and filtered out. The sky and the ground may have cooler temperatures than the vessel when capturing the infrared image, and may be depicted within the infrared image by low pixel values. The low temperature threshold may be used to identify those parts of the infrared image that is too cold to be the vessel. The remaining pixels may depict the vessel.

Figure 4:
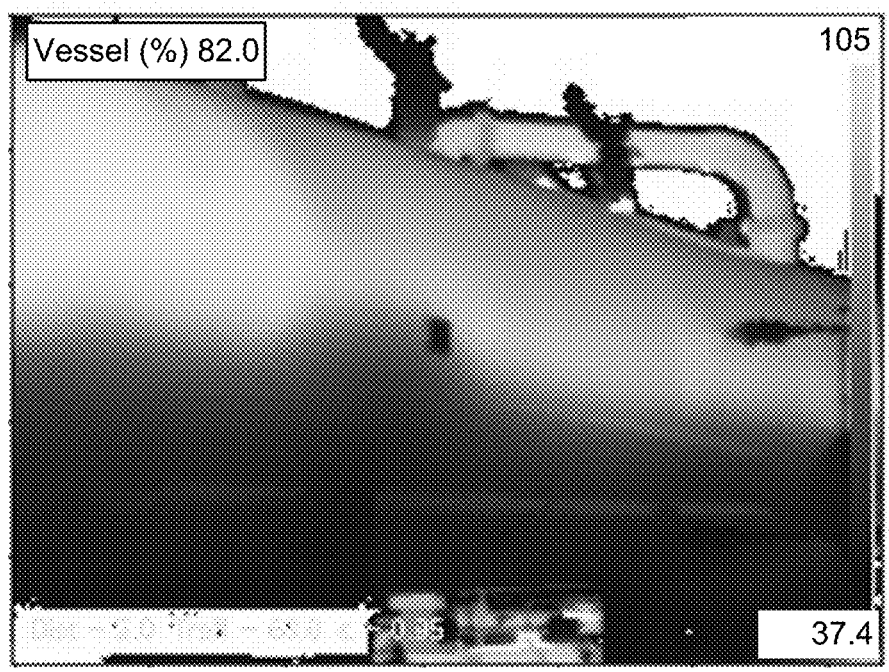
FIG. 4 illustrates an example depiction of a vessel within an infrared image.

FIG. 4 illustrates an example depiction of a vessel within an infrared image 400. The infrared image 400 may be generated from the infrared image 300 (shown in FIG. 3) by filtering out pixels with low values. Pixels with values lower than a low temperature threshold may be filtered out as depicting background. In some implementations, pixels with values same as the low temperature threshold may be filtered out. The remaining pixels may be deemed to depict the vessel. For example, in FIG. 4, 18 percent of the pixels in the infrared image 400 may have been filtered out as depicting background. 82 percent of the pixels in the infrared image 400 may be deemed to be depicting the vessel.

The pixel values of the infrared image may be determined based on pixels values of multiple channels of the infrared image or a single channel of the infrared image. For example, the infrared image may include three channels (e.g., red, green, blue) and the pixel values of pixels in the infrared image for filtering may be determined by (1) combining (e.g., using average, using weighted average) values in two or three channels or (2) using values in a single channel. As another example, the infrared image may be in greyscale and the pixel values of pixels in the infrared image for filtering may be determined by using greyscale values. As yet another example, the infrared image may store information in thermal units and the pixel values of pixels in the infrared image may be determined using absolute temperature values or the values recorded directly by the infrared camera. Other determination of pixel values of infrared images is contemplated.

Channel(s) of the infrared image that provide better/best contrast between the vessel and the background (e.g., sky, ground) may be used for filtering. For example, the blue or green channel of the infrared image may provide better contrast between the vessel and the background than the red channel of the infrared image. The pixel values of the infrared image for filtering may be determined by using either the blue or the green channel or a combination of the blue and the green channel. The pixel values of the infrared image for filtering may be determined by weighing the blue channel and/or the green channel more than the red channel.

The sand component 106 may be configured to determine one or more extents of an infrared image depicting the presence of sand in the vessel. An extent of an infrared image depicting the presence of sand in the vessel may refer to a part of the infrared image that shows the vessel with sand on the inside of the vessel. Determining an extent of an infrared image depicting the presence of sand in the vessel may include ascertaining, approximating, calculating, categorizing, classifying, detecting, establishing, estimating, finding, identifying, obtaining, quantifying, segmenting, and/or otherwise determining the extent of the infrared image depicting the presence of sand in the vessel. Determining an extent of an infrared image depicting the presence of sand in the vessel may include determining which extents of the infrared image is depicting the presence of sand in the vessel. Determining an extent of an infrared image depicting the presence of sand in the vessel may include determining which extents of the infrared image is not depicting the presence of sand in the vessel and finding the inverse of those extents. Determining an extent of an infrared image depicting the presence of sand in the vessel may include determining pixels of the infrared image that depicts the presence of sand in the vessel. Determining an extent of an infrared image depicting the presence of sand in the vessel may include determining pixels of the infrared image that do not depict the presence of sand in the vessel and finding inverse of those pixels.

In some implementations, determination of the extent(s) of the infrared image depicting the presence of sand in the vessel may include filtering out one or more portions of the extent(s) of the infrared image depicting the vessel. The vessel depicted by the infrared image may include part(s) that are filled with sand and part(s) that are not filled with sand (clean parts). The part(s) of the vessel that are not filled with sand may be filtered out to determine the parts of the infrared image that depicts the presence of sand in the vessel.

The portion(s) of the extent(s) of the infrared image depicting the vessel (the portion(s) of the infrared image depicting clean part(s) of the vessel) may be filtered out from the infrared image based on pixel values of the infrared image satisfying a high temperature threshold and/or other information. The pixel values of the infrared image may be determined based on pixels values of multiple channels of the infrared image (e.g., all channels, blue and red) or a single channel of the infrared image (e.g., blue or green). A high temperature threshold may refer to a value of temperature that a pixel value must be higher than (or equal to) for the corresponding pixel to be identified as depicting clean part(s) of the vessel. A high temperature threshold may refer to the maximum temperature value of the vessel that contains sand. The pixels values of the infrared image that satisfy the high temperature threshold may be identified as depicting clean parts of the vessel and filtered out. The parts of the vessel that do not include sand inside may have hotter temperatures than the parts of the vessel that include sand inside, and may be depicted within the infrared image by high pixel values. The high temperature threshold may be used to identify those parts of vessel within the infrared image that is too hot to include sand on the inside of the vessel. The remaining pixels may depict the parts of the vessel with sand on the inside of the vessel. The remaining pixels may depict the presence of sand in the vessel.

Figure 5:
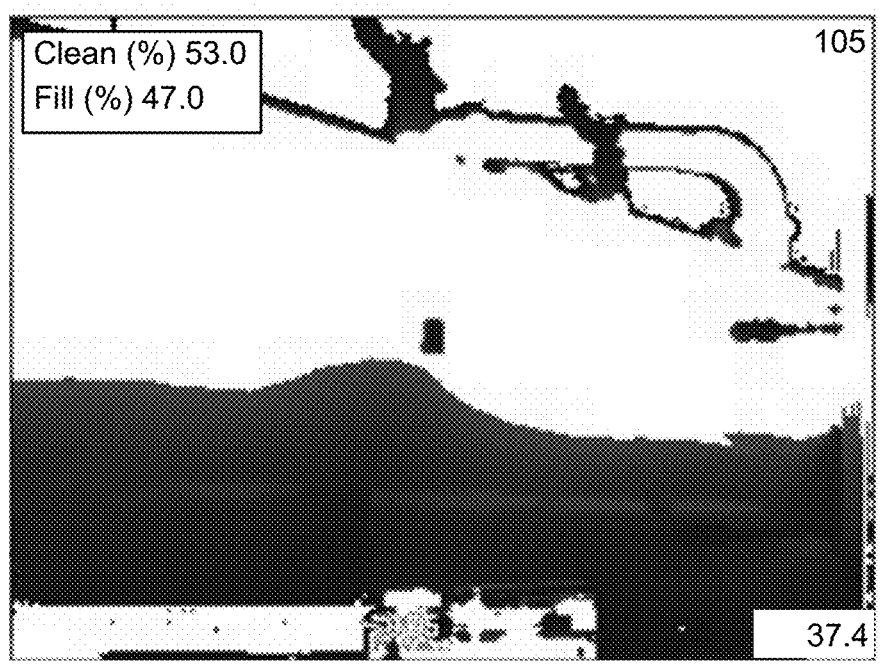
FIG. 5 illustrates an example depiction of the presence of sand in a vessel within an infrared image.

FIG. 5 illustrates an example depiction of the presence of sand in a vessel within an infrared image 500. The infrared image 500 may be generated from the infrared image 400 (shown in FIG. 4) by filtering out pixels with high values. Pixels with values higher than a high temperature threshold may be filtered out as depicting clean parts of the vessel (parts of the vessel without sand on the inside). In some implementations, pixels with values same as the high temperature threshold may be filtered out. The remaining pixels may be deemed to depict the presence of sand in the vessel. For example, in FIG. 5, 53 percent of the pixels that depict the vessel in the infrared image 500 may have been filtered out as depicting parts of the vessel that do not contain sand. 47 percent of the pixels that depict the vessel in the infrared image 500 may be deemed to depict the presence of sand in the vessel.

Figure 6:
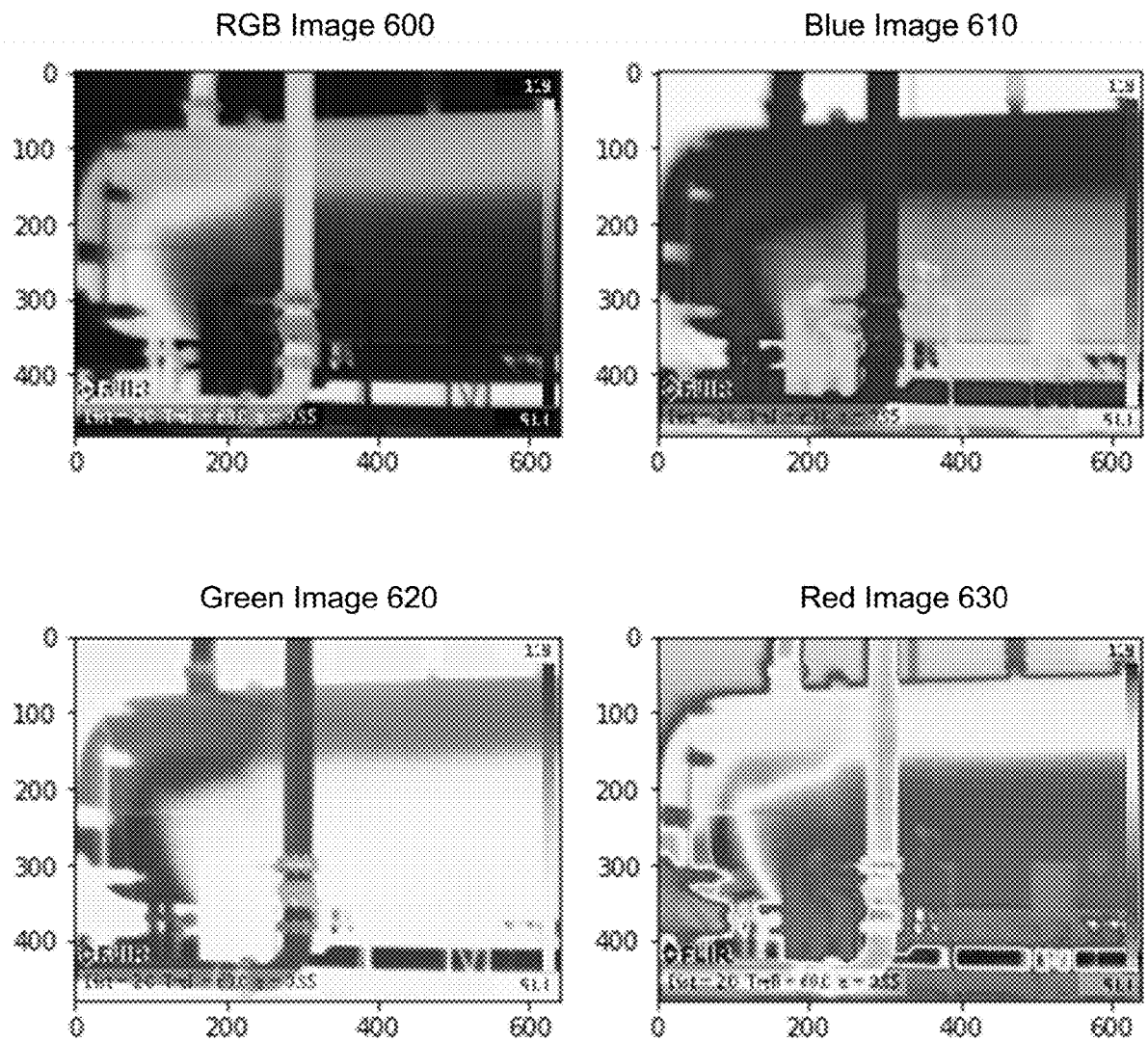
FIG. 6 illustrates different color channels of an example infrared image.

FIG. 6 illustrates different color channels of an example infrared image. RGB image 600 shows RGB pixel values of an infrared image, blue image 610 shows blue pixel values of the infrared image, green image 620 shows green pixel values of the infrared image, and red image 630 shows red pixel values of the infrared image. Pixel values from one or multiple channels of the infrared image may be used to filter out pixels in the RGB image 600. For example, low values of pixels in the blue image 610 (e.g., pixel values lower than 30) may be used to filter out portions of the RGB image 600 that depict the background (e.g., sky, ground). High values of pixels in the blue image 610 and/or the green image 620 (e.g., pixel values greater than 210) may be used to filter out portions of the RGB image 600 that depict clean parts of the vessel (parts of the vessel without sand on the inside). Other uses of different channels/combinations of channels of the infrared image for filtering are contemplated.

Figure 7:
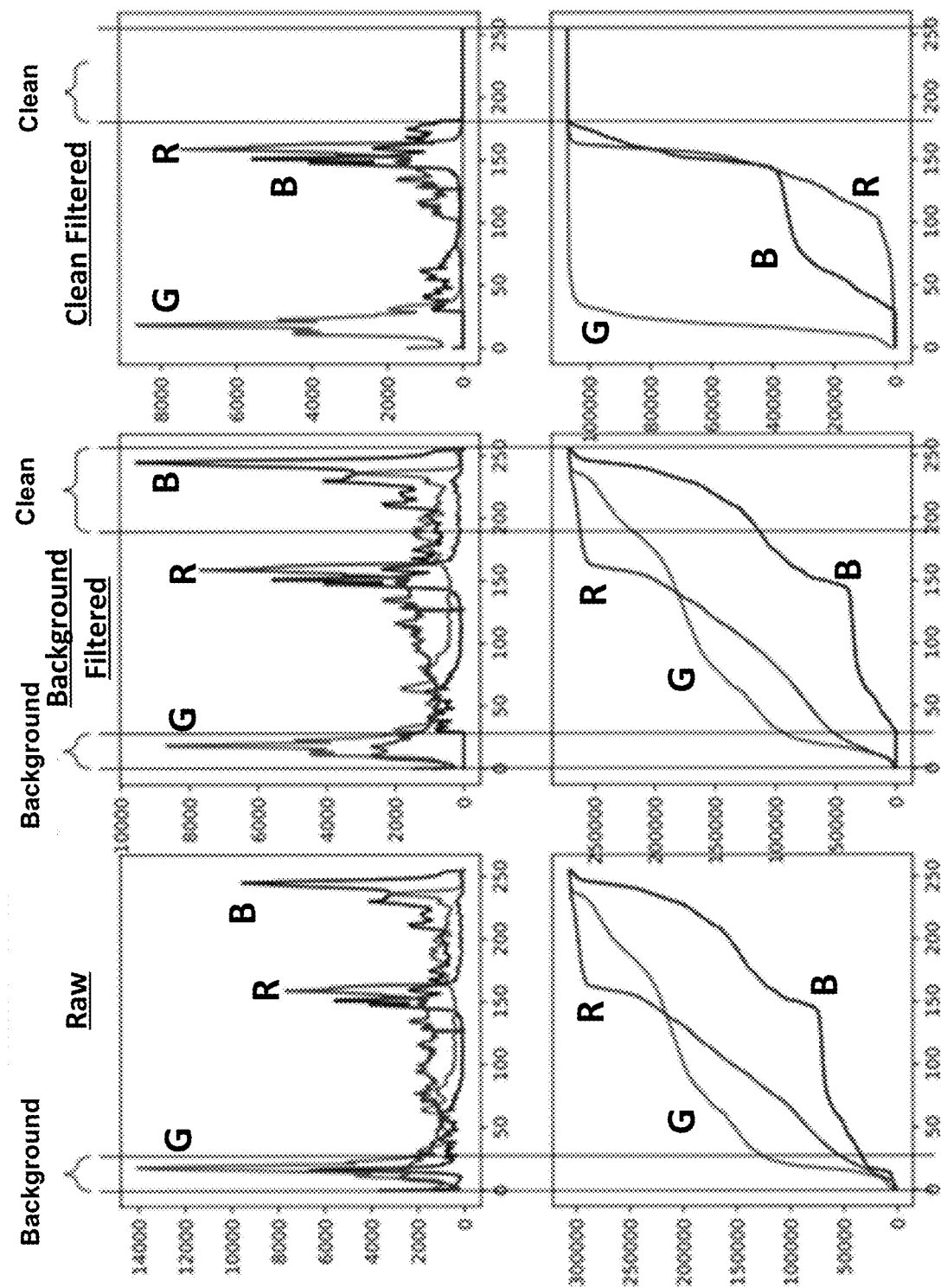
FIG. 7 illustrates example histograms and cumulative plots of an infrared image.

FIG. 7 illustrates example histograms and cumulative plots of an infrared image. The top row of FIG. 7 shows histograms for red, blue, and green channels of the infrared image. The bottom row of FIG. 7 shows cumulative plots for red, blue, and green channels of the infrared image. The left column shows information on pixel values for raw infrared image. The center column shows information on pixels values for infrared image with background (e.g., sky, ground) filtered out, such as by removing pixels with low blue pixel values. The remaining pixels may depict the vessel. The right columns show information on pixels values for infrared image with clean parts of the vessel filtered out, such as by removing pixels with high blue pixel values. The remaining pixels may depict the presence of sand in the vessel. In some implementations, the threshold values used to filter out pixels may be determined based on peaks of the histograms.

The sand infill component 108 may be configured to determine a sand infill value for the vessel. Determining a sand infill value for the vessel may include ascertaining, approximating, calculating, establishing, estimating, finding, identifying, obtaining, quantifying, and/or otherwise determining the sand infill value for the vessel. The sand infill value may refer to a value that characterizes, defines, indicates, and/or reflects the amount of sand in the vessel. For example, the sand infill value may refer to the percentage and/or ratio of vessel that is filled with sand (fill percentage, fill ratio).

The sand infill value for the vessel may be determined based on the extent(s) of the infrared image depicting the vessel, the extent(s) of the infrared image depicting the presence of sand in the vessel, and/or other information. For example, the sand infill value for the vessel may be determined based on the amount of the infrared image depicting the vessel and the amount of the infrared image depicting the presence of sand in the vessel. For example, the number of pixels depicting the vessel and the number of pixels depicting the presence of sand in the vessel may be counted, and the number of pixel depicting the presence of sand in the vessel may be divided by the number of pixels depicting the vessel. For example, the non-null pixel count in the infrared image 500 shown in FIG. 5 may be divided by the non-null pixel count in the infrared image 400 shown in FIG. 4, and then multiplied by 100 to compute the fill percentage for the vessel.

In some implementations, separate sand infill values may be determined for infrared images captured at different capture times. Capture times may refer to moments when infrared images are captured (e.g., generated, converted, recorded) by an infrared camera. Multiple infrared images captured at different capture times may be analyzed to generate time series data on the presence of sand inside the vessel.

The sand monitoring component 110 may be configured to facilitate sand monitoring for the vessel. Sand monitoring for the vessel may refer to monitoring the presence of sand in the vessel. Sand monitoring for the vessel may refer to monitoring accumulation of sand in the vessel. Sand monitoring for the vessel may refer to monitoring how much sand is in the vessel, the rate at which the amount of sand in the vessel is changing, forecasting how much sand will be in the vessel in the future, and/or otherwise monitoring the amount of sand in the vessel. The sand monitoring for the vessel may be performed based on the sand infill value for the vessel and/or other information. The sand monitoring for the vessel may be performed based on the sand infill value for a particular moment in time and/or for different moments in time.

For example, the sand infill value at a particular moment in time and/or at different moments in time (e.g., trend of sand infill value over time) may be used to determine whether and/or how much sand is currently entering/traveling through the vessel. The sand infill value at a particular moment in time and/or at different moments in time may be used to determine whether and/or how much sand has entered/traveled through the vessel in the past. The sand infill value at a particular moment in time and/or at different moments in time may be used to determine whether and/or how much sand will enter/travel through the vessel in the future.

The sand monitoring component 110 may facilitate use of the sand infill value to perform sand monitoring for the vessel. The sand monitoring component 110 may facilitate use of information relating to and/or determined from the sand infill value to perform sand monitoring for the vessel. For example, facilitating sand monitoring for the vessel may include (1) presenting the sand infill value on the electronic display 14, (2) presenting information relating to and/or determined from the sand infill value on the electronic display 14, (3) presenting results of sand monitoring for the vessel on the electronic display 14, (4) providing information relating to and/or determined from the sand infill value to one or more sand monitoring processes, and/or (5) performing sand monitoring for the vessel using information relating to and/or determined from the sand infill value. In some implementations, one or more alarms may be generated based on the sand infill value. For example, an alarm may be generated based on the sand infill value reaching a certain value and/or the rate at which the sand infill value is changing reaching a certain rate. Different alarms may be generated based on the sand infill value reaching different values and/or the rate at which the sand infill value is changing reaching different certain rates.

In some implementations, a trend of sand infill values for the vessel may be determined based on the sand infill value for different capture times, the different capture times, and/or other information. Sand infill values determined using infrared images from different capture times may be used to determine the general way in which the sand infill value for the vessel is changing over time. The trend of sand infill values for the vessel may be used to forecast how much sand will be in the vessel in the future and/or how the rate at which the sand accumulates in the vessel will change in the future. For example, a future sand infill value for the vessel may be determined based on the trend of sand infill values for the vessel and/or other information. Based on current sand infill value and the rate at which the sand infill value is changing/has changed in the past, sand infill value in the future may be predicted. Current sand infill value and the rate at which the sand infill value is changing/has changed in the past may be used to predict when a critical level of sand in the vessel will be reached.

Forecasting of future sand infill values for vessels may enable maintenance operation for the vessels to be scheduled based on need/conditions of individual vessels. For example, rather than scheduling maintenance operation at set intervals of time, maintenance operation for individual vessels may be scheduled based on how much sand is in the vessel and the speed at which the vessel is being filled with sand. This has significant business impact on both revenue and cost savings.

In some implementations, the trend of sand infill values for the vessel and/or historical sand infill values for the vessel may be used to build confidence in interpretation of infrared images. For example, a drop in sand infill value would not be expected unless a cleanout had been performed. If a drop in sand infill value that is not the result of a cleanout may be removed/flagged as being unreliable.

In some implementations, the trend of sand infill values for the vessel may be presented on the electronic display 14. For example, the trend of sand infill values may be plotted for presentation on the electronic display 14. The plot may provide visualization of the historical trend and/or predicted trend of sand infill values.

In some implementations, facilitation of the sanding monitoring for the vessel based on the sand infill value for the vessel may include recommendation or automation of one or more maintenance operations for the vessel based on the sand infill value and/or other information. A maintenance operation for the vessel may refer to an operation to fix, preserve, replace, restore, and/or otherwise maintain the health/usage of the vessel. Facilitation of the sanding monitoring for the vessel may include carrying out, controlling, initiating, scheduling, and/or otherwise performing one or more maintenance operation for the vessel. Different maintenance operations may be facilitated based on different amounts of sand infill value. For example, if the sand infill value is between 5 and 15%, a flush (e.g., online belly flush) of the vessel may be facilitated. If the sand infill value is greater than 15%, a cleanout (e.g., full offline cleanout) of the vessel may be facilitated. The sand infill values for multiple vessels may be used to facilitate maintenance operation for the multiple vessels (e.g., optimize cleaning, prioritize maintenance operations for vessels that are more critical for production or closer to critical sand infill value, schedule maintenance operations for vessels based on their proximity to each other). The sand infill values for multiple vessels may be used to facilitate inspection of the vessels. For example, vessels in which sand infill values are increasing rapidly may be scheduled for inspection at a faster rate than vessels in which sand infill values are increasing slowly.

In some implementations, the sand infill value for the vessel may be modified based on inspection of sand in the vessel and/or other information. For example, the sand in the vessel may be inspected manually by a person or a tool to record the actual amount of sand in the vessel. The sand infill value determined using the infrared image may be replaced/augmented with the actual sand infill value for the vessel. The difference between the sand infill value determined using the infrared image and the actual sand infill value for the vessel may be used to adjust determination of the sand infill value. The actual sand infill values may be used to correct errors and/or biases in sand infill values calculated from infrared images.

In some implementations, perspective correction may be performed on infrared images. Perspective correction may warp, transform, or otherwise change an infrared image so that the vessel appears to have been captured straight on by the infrared camera. For example, referring to FIG. 3, the infrared image 300 may have been captured such that the vessel has a slant. Perspective correction may change the infrared image 300 so that the vessel is not slanted.

In some implementations, perspective correction may not be performed on infrared images. Use of the sand infill value to monitor sand in the vessel may reduce/eliminate the need to perform perspective correction. For example, use of the fill percentage/fill ratio to monitor sand inside the vessel may decrease error introduced by the vessel being slanted within the infrared images. Additionally, actual value of the sand infill value may be less important than changes in the sand infill value over time. Use of the rate of change in the sand infill value to monitor sand inside the vessel may decrease error introduced by the vessel being slanted within the infrared images.

In some implementations, one or more graphical user interfaces may be presented on the electronic display 14. A graphical user interface may refer to a user interface that enables a user to interact with the system 10. A graphical user interface may refer to a user interface that enables the system 10 to provide information to a user. A graphical user interface may refer to a user interface that enables a user to provide input to the system 10.

For example, the graphical user interface(s) may be presented to provide (1) information on the quality of infrared images to the user, (2) information on or relating to sand infill values for vessels depicted within infrared images, (3) information on historical analysis of infrared images, (4) information on recommended maintenance operations for vessels, (5) information on maintenance operations scheduled/performed for vessels, and/or (6) information on trends of sand infill values for vessels. The graphical user interface(s) may be presented to provide other information relating to sand monitoring and maintenance of vessels.

The graphical user interface(s) may be presented to enable a user to (1) upload infrared images for analysis, (2) specify metadata (e.g.,) to be associated with infrared images, (3) select/schedule/change maintenance operations for vessels depicted within infrared images, (4) assign maintenance operations to specific personnel, (5) confirm/correct sand infill values for vessels, (6) add/remove/change notes to infrared images/interpretations of infrared images, and/or (7) fill out work orders for vessels. The graphical user interface(s) may be presented to enable a user to perform other tasks to perform sand monitoring and maintenance of vessels.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the electronic display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
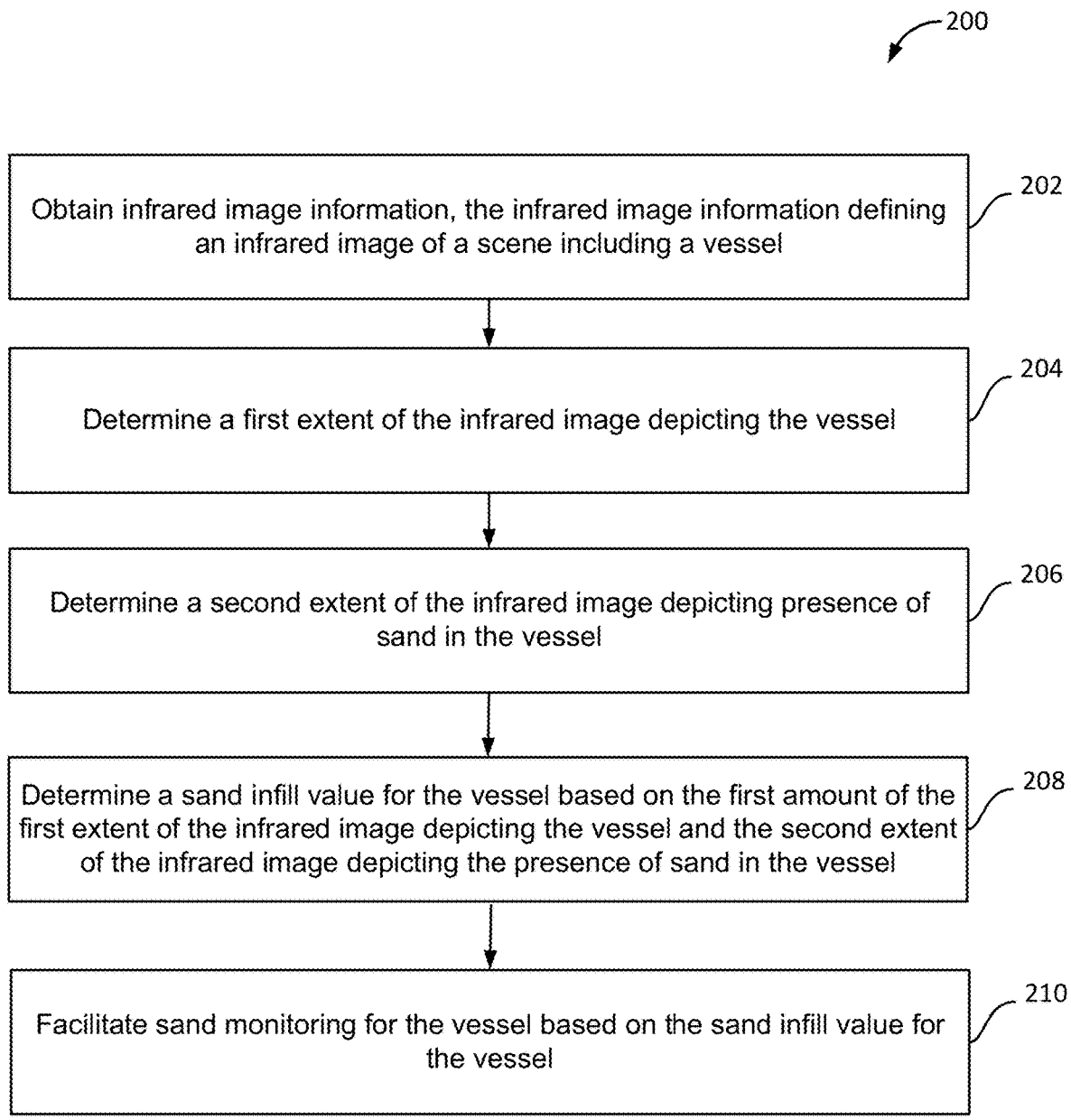
FIG. 2 illustrates an example method for vessel sand monitoring.

FIG. 2 illustrates method 200 for vessel sand monitoring. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, infrared image information and/or other information may be obtained. The infrared image information may define an infrared image of a scene including a vessel. In some implementations, operation 202 may be performed by a processor component the same as or similar to the infrared image component 102 (Shown in FIG. 1 and described herein).

At operation 204, a first extent of the infrared image depicting the vessel may be determined. In some implementations, operation 204 may be performed by a processor component the same as or similar to the vessel component 104 (Shown in FIG. 1 and described herein).

At operation 206, a second extent of the infrared image depicting presence of sand in the vessel may be determined. In some implementations, operation 206 may be performed by a processor component the same as or similar to the sand component 106 (Shown in FIG. 1 and described herein).

At operation 208, a sand infill value for the vessel may be determined based on the first extent of the infrared image depicting the vessel, the second extent of the infrared image depicting the presence of sand in the vessel, and/or other information. In some implementations, operation 208 may be performed by a processor component the same as or similar to the sand infill component 108 (Shown in FIG. 1 and described herein).

At operation 210, sand monitoring for the vessel may be facilitated based on the sand infill value for the vessel and/or other information. In some implementations, operation 210 may be performed by a processor component the same as or similar to the sand monitoring component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for vessel sand monitoring, the system comprising:
   an infrared imaging device configured to capture infrared images;
   one or more physical processors configured by machine-readable instructions to:
      obtain infrared image information for multiple infrared images captured by the infrared imaging device, the infrared image information individually defining the multiple infrared images of a scene including a vessel, individual ones of the multiple infrared images captured by the infrared imaging device at different capture times;
      determine a sand infill value individually for the multiple infrared images, wherein determining the sand infill value of a given infrared image from the multiple infrared images includes:
         determining a first extent of the given infrared image depicting the vessel;
         determining a second extent of the given infrared image depicting presence of sand in the vessel; and
         determining a sand infill value for the vessel based on the first extent of the given infrared image depicting the vessel and the second extent of the given infrared image depicting the presence of sand in the vessel;
      determine a trend of sand infill values for the vessel based on the sand infill value for the individual ones of the multiple infrared images and the capture times of the multiple infrared images;
      determine a future sand infill value for the vessel based on the trend of sand infill values for the vessel;
      determine a maintenance recommendation for the vessel based on the future sand infill value; and
      effectuate presentation of the maintenance recommendation on a physical electronic display.

2. The system of claim 1, wherein determination of the first extent of the given infrared image depicting the vessel includes filtering out depictions of sky and ground from the given infrared image based on pixel values of the given infrared image satisfying a low temperature threshold.

3. The system of claim 2, wherein the pixel values of the given infrared image are determined based on pixels values of a single channel of the given infrared image.

4. The system of claim 3, wherein the single channel of the infrared image is a blue channel or a green channel of the given infrared image.

5. The system of claim 2, wherein the pixel values of the given infrared image are determined based on pixels values of multiple channels of the given infrared image.

6. The system of claim 1, wherein determination of the second extent of the given infrared image depicting the presence of sand in the vessel includes filtering out a portion of the first extent of the given infrared image based on pixel values of the given infrared image satisfying a high temperature threshold.

7. The system of claim 1, wherein the recommendation maintenance recommendation identifies an automation of one or more maintenance operations for the vessel based on the sand infill value.

8. The system of claim 1, wherein the sand infill value for the vessel is modified based on inspection of sand in the vessel.

9. A method for vessel sand monitoring, the method comprising:
   capturing multiple infrared images, wherein such capture generates infrared image information for the multiple infrared images, the infrared image information individually defining the multiple infrared images of a scene including a vessel, individual ones of the multiple infrared images having been captured at different capture times;
   determining a sand infill value individually for the multiple infrared images, wherein determining the sand infill value of a given infrared image from the multiple infrared images includes:
      determining a first extent of the given infrared image depicting the vessel;
      determining a second extent of the given infrared image depicting presence of sand in the vessel; and
      determining a sand infill value for the vessel based on the first extent of the given infrared image depicting the vessel and the second extent of the given infrared image depicting the presence of sand in the vessel;
   determining a trend of sand infill values for the vessel based on the sand infill value for the individual ones of the multiple infrared images and the capture times of the multiple infrared images;
   determining a future sand infill value for the vessel based on the trend of sand infill values for the vessel;
   determining a maintenance recommendation for the vessel based on the future sand infill value; and
   effectuating presentation of the maintenance recommendation on a physical electronic display.

10. The method of claim 9, wherein determining the first extent of the given infrared image depicting the vessel includes filtering out depictions of sky and ground from the given infrared image based on pixel values of the given infrared image satisfying a low temperature threshold.

11. The method of claim 10, wherein the pixel values of the given infrared image are determined based on pixels values of a single channel of the given infrared image.

12. The method of claim 11, wherein the single channel of the given infrared image is a blue channel or a green channel of the given infrared image.

13. The method of claim 10, wherein the pixel values of the given infrared image are determined based on pixels values of multiple channels of the given infrared image.

14. The method of claim 9, wherein determining the second extent of the given infrared image depicting the presence of sand in the vessel includes filtering out a portion of the first extent of the given infrared image based on pixel values of the given infrared image satisfying a high temperature threshold.

15. The method of claim 9, wherein the recommendation maintenance recommendation identifies an automation of one or more maintenance operations for the vessel based on the sand infill value.

16. The method of claim 9, wherein the sand infill value for the vessel is modified based on inspection of sand in the vessel.

\* \* \* \* \*